(12) United States Patent
Mayerle et al.

(10) Patent No.: US 9,286,584 B2
(45) Date of Patent: Mar. 15, 2016

(54) VISUALIZING BUSINESS PROCESSES OR SCENARIOS IN A BUSINESS SOFTWARE MODEL USING TRANSIT MAPS

(75) Inventors: Jochen Mayerle, Flein (DE); Marianne Brosche, Heidelberg (DE); Ulrich Keil, Heidelberg (DE); Holger Knospe, Wiesloch (DE); Laura Olson, Wiesloch (DE); Joachim Fessler, Grafenberg (DE); Guenter Pecht-Seibert, Muehlhausen (DE)

(73) Assignee: SAP SE, Walldorf (DE)

( * ) Notice: Subject to any disclaimer, the term of this patent is extended or adjusted under 35 U.S.C. 154(b) by 1014 days.

(21) Appl. No.: 13/325,632

(22) Filed: Dec. 14, 2011

(65) Prior Publication Data

US 2013/0159896 A1  Jun. 20, 2013

(51) Int. Cl.
G06F 3/00 (2006.01)
G06F 3/048 (2013.01)
G06Q 10/06 (2012.01)

(52) U.S. Cl.
CPC .......... *G06Q 10/06* (2013.01); *G06Q 10/06375* (2013.01)

(58) Field of Classification Search
None
See application file for complete search history.

(56) References Cited

U.S. PATENT DOCUMENTS

| | | | |
|---|---|---|---|
| 5,850,221 A * | 12/1998 | Macrae et al. | 715/853 |
| 5,877,766 A | 3/1999 | Bates et al. | |
| 6,426,759 B1 * | 7/2002 | Ting et al. | 715/763 |
| 7,113,923 B1 | 9/2006 | Brichta et al. | |
| 7,280,793 B2 | 10/2007 | Zess et al. | |
| 7,606,803 B2 * | 10/2009 | Bou-Ghannam et al. | |
| 7,711,694 B2 | 5/2010 | Moore | |
| 7,716,278 B2 | 5/2010 | Beringer et al. | |
| 7,735,022 B2 | 6/2010 | Danninger et al. | |
| 7,853,607 B2 | 12/2010 | Moore et al. | |
| 7,925,985 B2 | 4/2011 | Moore | |
| 7,925,994 B2 * | 4/2011 | Olsen et al. | 715/841 |
| 8,046,716 B2 * | 10/2011 | Nelson | 715/837 |
| 8,181,150 B2 | 5/2012 | Szpak et al. | |
| 8,261,233 B2 | 9/2012 | Szpak et al. | |

(Continued)

OTHER PUBLICATIONS

"Object Interactions in Graphical Interface for Print Administration." *IBM Technical Disclosure*. Oct. 1996.

(Continued)

*Primary Examiner* — Yongjia Pan
(74) *Attorney, Agent, or Firm* — Mintz Levin Cohn Ferris Glovsky and Popeo, P.C.

(57) ABSTRACT

A business scenario landscape map can show a scenario-centric view of a business scenario landscape that includes business scenarios accessible to members of an organization and supported by a business software architecture. In the scenario-centric view, first user interface elements can be arranged to show a linear representation of business process features of a selected business scenario and a visual depiction of relationships between the selected business scenario and other business scenarios. Upon receiving selection of a first user interface element(s) related to another business scenario, at least some of the first user interface elements can be rearranged to show a new scenario-centric view of the business scenario landscape in which business process features of the newly selected business scenario are arranged in a new linear representation including a visual depiction of relationships between the newly selected business scenario, the originally selected business scenario, and/or relationships with other additional scenarios.

17 Claims, 7 Drawing Sheets

(56) References Cited

U.S. PATENT DOCUMENTS

| | | | |
|---|---|---|---|
| 8,332,405 B2 * | 12/2012 | Wagenblatt et al. | 707/736 |
| 8,468,491 B2 | 6/2013 | Markovic | |
| 8,621,421 B2 * | 12/2013 | Klaka et al. | 717/104 |
| 8,725,892 B2 * | 5/2014 | Reese | 709/232 |
| 2002/0128890 A1 | 9/2002 | Dick et al. | |
| 2003/0154090 A1 | 8/2003 | Bernstein et al. | |
| 2003/0158832 A1 | 8/2003 | Sijacic et al. | |
| 2003/0216928 A1 | 11/2003 | Shour | |
| 2004/0010502 A1 | 1/2004 | Bomfim et al. | |
| 2004/0030992 A1 | 2/2004 | Moisa et al. | |
| 2004/0102990 A1 | 5/2004 | Jones | |
| 2004/0107414 A1 | 6/2004 | Bronicki et al. | |
| 2004/0119752 A1 | 6/2004 | Beringer et al. | |
| 2004/0181775 A1 | 9/2004 | Anonsen et al. | |
| 2005/0004825 A1 | 1/2005 | Ehrler et al. | |
| 2005/0086588 A1 * | 4/2005 | McGregor et al. | 715/505 |
| 2005/0155000 A1 | 7/2005 | Weiler et al. | |
| 2005/0262008 A1 | 11/2005 | Cullen et al. | |
| 2006/0005140 A1 | 1/2006 | Crew et al. | |
| 2006/0015383 A1 | 1/2006 | Beringer et al. | |
| 2006/0074703 A1 | 4/2006 | Bhandarkar et al. | |
| 2006/0074730 A1 | 4/2006 | Shukla et al. | |
| 2006/0074736 A1 | 4/2006 | Shukla et al. | |
| 2006/0074915 A1 * | 4/2006 | Bhandarkar et al. | 707/9 |
| 2006/0149568 A1 | 7/2006 | Dreiling et al. | |
| 2006/0206348 A1 | 9/2006 | Chen et al. | |
| 2006/0206366 A1 | 9/2006 | Habib et al. | |
| 2007/0156649 A1 | 7/2007 | Fischer | |
| 2007/0162500 A1 | 7/2007 | Herwadkar | |
| 2007/0192715 A1 | 8/2007 | Kataria et al. | |
| 2007/0226038 A1 | 9/2007 | Das et al. | |
| 2007/0233508 A1 | 10/2007 | Gillespie | |
| 2007/0240046 A1 * | 10/2007 | Yan et al. | 715/700 |
| 2007/0245300 A1 | 10/2007 | Chan et al. | |
| 2007/0265862 A1 | 11/2007 | Freund et al. | |
| 2007/0271526 A1 | 11/2007 | Powley | |
| 2007/0276714 A1 | 11/2007 | Beringer | |
| 2008/0040191 A1 | 2/2008 | Chakravarty et al. | |
| 2008/0052274 A1 | 2/2008 | Moore et al. | |
| 2008/0052358 A1 | 2/2008 | Beaven et al. | |
| 2008/0065675 A1 | 3/2008 | Bozich et al. | |
| 2008/0077530 A1 * | 3/2008 | Banas et al. | 705/50 |
| 2008/0140472 A1 | 6/2008 | Gilat et al. | |
| 2008/0168376 A1 | 7/2008 | Tien et al. | |
| 2008/0177622 A1 | 7/2008 | Akkiraju et al. | |
| 2009/0006146 A1 | 1/2009 | Chowdhary et al. | |
| 2009/0070698 A1 | 3/2009 | Shurtleff et al. | |
| 2009/0106640 A1 | 4/2009 | Handy et al. | |
| 2009/0210268 A1 | 8/2009 | Fan et al. | |
| 2010/0082292 A1 | 4/2010 | Pantaleano et al. | |
| 2010/0083374 A1 | 4/2010 | Schmitlin et al. | |
| 2010/0121740 A1 | 5/2010 | Reed et al. | |
| 2010/0185474 A1 | 7/2010 | Frank | |
| 2011/0071869 A1 | 3/2011 | O'Brien et al. | |
| 2011/0082721 A1 | 4/2011 | Arni et al. | |
| 2011/0125756 A1 | 5/2011 | Spence et al. | |
| 2011/0138340 A1 * | 6/2011 | Holm-Petersen et al. | 715/854 |
| 2011/0145738 A1 | 6/2011 | Laugwitz et al. | |
| 2012/0059842 A1 | 3/2012 | Hille-Doering et al. | |
| 2012/0090037 A1 | 4/2012 | Levit | |
| 2012/0136693 A1 * | 5/2012 | Patil et al. | 705/7.27 |
| 2012/0311451 A1 | 12/2012 | Beaven | |
| 2013/0024795 A1 | 1/2013 | Robotham et al. | |
| 2013/0159007 A1 | 6/2013 | Brosche et al. | |
| 2013/0159034 A1 | 6/2013 | Herter et al. | |
| 2013/0159036 A1 | 6/2013 | Keil et al. | |
| 2013/0159037 A1 | 6/2013 | Keil et al. | |
| 2013/0159047 A1 | 6/2013 | Mayerle et al. | |
| 2013/0159060 A1 | 6/2013 | Steinbach | |
| 2013/0159061 A1 | 6/2013 | Fessler et al. | |
| 2013/0159063 A1 | 6/2013 | Fessler et al. | |
| 2013/0159199 A1 | 6/2013 | Keil et al. | |
| 2013/0159898 A1 | 6/2013 | Knospe et al. | |
| 2013/0159906 A1 | 6/2013 | Knospe et al. | |
| 2013/0159907 A1 | 6/2013 | Brosche et al. | |
| 2013/0159908 A1 | 6/2013 | Mayerle et al. | |

OTHER PUBLICATIONS

Rockwell Automation, Arena Training Course (2005).

* cited by examiner

VISUALIZING BUSINESS PROCESSES OR SCENARIOS IN A BUSINESS SOFTWARE MODEL USING TRANSIT MAPS

CROSS-REFERENCE TO RELATED APPLICATIONS

The current application is related to the following co-pending and co-owned U.S. patent applications, the disclosure of each of which is incorporated herein in its entirety: application Ser. No. 13/326,270, filed Dec. 14, 2011, entitled "Business Process Guide and Record"; application Ser. No. 13/325,546, filed Dec. 14, 2011, entitled "Monitoring and Control of Business Processes and Scenarios"; application Ser. No. 13/325,605, filed Dec. 14, 2011, entitled "Runtime Generation of Instance Contexts Via Model-Based Data Relationships"; application Ser. No. 13/325,632, filed Dec. 14, 2011, entitled "Visualizing Business Processes or Scenarios in a Business Software Model Using Transit Maps"; application Ser. No. 13/326,026, filed Dec. 14, 2011, entitled "Displaying and Changing Scenario-Based or Process-Based business Configurations"; application Ser. No. 13/326,052, filed Dec. 14, 2011, entitled "Incorporating External Business Process Features Into a Scenario Visualization or Navigation Tool"; application Ser. No. 13/326,075, filed Dec. 14, 2011, entitled "Dynamic Business Scenario Key Performance Indicator Definitions, Real Time Calculations, and Analysis", application Ser. No. 13/326,190, filed Dec. 14, 2011, entitled "Dynamic Enhancement of Context Matching Rules for Business Scenario Models"; application Ser. No. 13/326,207, filed Dec. 14, 2011, entitled "Linear Visualization for Overview, Status Display, and Navigation Along Business Scenario Instances"; application Ser. No. 13/326,230, filed Dec. 14, 2011, entitled "Launch of Target User Interface Features Based on Specific Business Process Instances"; application Ser. No. 13/326,254, filed Dec. 14, 2011, entitled "Multilevel Visualization of Scenario Models and Scenario Instances"; application Ser. No. 13/326,261, filed Dec. 14, 2011, entitled "Process-Based User Authorization Management"; application Ser. No. 13/326,266, filed Dec. 14, 2011, entitled "Correlation-Based Dynamic Determination of Transactional Instance Contexts"; and Ser. No. 13/326,279, filed Dec. 14, 2011, entitled "Seamless Morphing from Scenario Model to System-Based Instance Visualization".

TECHNICAL FIELD

The subject matter described herein relates generally to enhancing user interaction with, and navigation among, features, functions, controls, and the like of an integrated software suite, such as for example an enterprise resource planning solution.

BACKGROUND

The inherent complexity of business scenarios, which can include one or more business processes, and their implementation in business software solutions, enterprise resource planning (ERP) systems, and the like can present substantial challenges to users and can be a serious obstacle to widespread operative use of process and scenario models in the software landscape. A wealth of highly technical process modeling notations (e.g. business process modeling notation (BPMN) editors and process engines, enhanced process chains (EPC), modeling hierarchies built on these or similar model types, etc.) is currently available for use in in technical systems. However, these types of resources are typically difficult for a non-technical user to understand and use. While numerous non-technical tools exist for depicting high-level processes (e.g. drawing, mind-map, or presentation tools, or the like), such tools typically lack any operative connection with the underlying transactional data relating to specific instances of business processes or business scenarios in a business software architecture and therefore can provide only a picture of an idealized concept of a business scenario.

SUMMARY

In one aspect, a method includes displaying, via a user interface, a business scenario landscape map showing a scenario-centric view of a business scenario landscape. The business scenario landscape includes a plurality of business scenarios accessible to members of an organization and supported by a business software architecture, and the scenario-centric view includes a plurality of first user interface elements arranged to show a linear representation of a plurality of first business process features of a selected business scenario of the plurality of business scenarios and a visual depiction of at least one relationship between the selected business scenario and an other business scenario of the plurality of business scenarios. A selection of one or more of the plurality of first user interface elements related to the other business scenario is received via the user interface, and, in response to receiving the plurality of first user interface elements to show a new scenario-centric view of the business scenario landscape, the new scenario-centric view is rearranged to include at least a subset of the plurality of first user interface elements arranged to show a new linear representation of a plurality of second business process features of the other business scenario and a visual depiction of the at least one relationship and of at least one other relationship between the other business scenario and a third business scenario.

In some variations one or more of the following features can optionally be included in any feasible combination. The at least one relationship can optionally include one or more of a business scenario intersection relationship, a business scenario dependency relationship, a business scenario prerequisite relationship, and a business scenario predecessor-successor relationship. The scenario-centric view can optionally include the selected business scenario being arranged approximately centrally in the business scenario landscape map. The selected business scenario can optionally include at least one of a currently active business scenario being operated on by a current user of the business software architecture and a most relevant business scenario to a role of the current user. Upon receiving a navigation command entered via one or more of the plurality of first user interface elements, a second visualization layer based on the metadata can optionally be presented via the user interface. The second visualization layer can optionally include a plurality of second user interface elements displayed in a navigation pane concurrently with a work pane. The plurality of second user interface elements can optionally be arranged in a linear progression to represent a linear sequence of a plurality of second business process features of one of the plurality of business scenarios. The work pane can optionally include a plurality of additional user interface elements corresponding to functionality provided by one or more feature modules of the business software architecture related to a currently selected one of the plurality of second business process features. The plurality of first user interface elements can optionally be arranged in the business scenario landscape map to form a transit map view of the business scenario landscape in which each of the selected business scenario and the other business scenario are shown as linearized processes represented by a plurality of stops each representing a business process feature that is part of one or more of the selected business scenario and the other business scenario and a linear route linking at least some of those business process features that are part of each of the selected business scenario and the other business scenario.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. For example, business scenario and business process visualizations can be provided in the business language of the customer where predefined processes and scenarios are already delivered by a vendor of a business software architecture. Software partners of the business software architecture vendor can also position add-on feature modules or the like, which can in some examples be distinguished visually or in some other manner (e.g. a distinct color coding, etc.) to allow rapid identification of partner extensions of end-to-end processes, processes, process steps, and the like. Software sales and implementation can be assisted, for example by enabling a sales pitch to seamlessly incorporate all features from a holistic business scenario model down to individual transactional user interfaces. Implementations of the current subject matter can also provide a platform for visualizing and editing additional categories of information aligned along the dimension of business scenarios of a company.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Typical, day-to-day business users do not know and do not generally wish to learn the syntax of BPMN or similar notations just to be able to match their business needs with the features and capabilities of a business software solution. Notations like BPMN or EPC are generally addressed to a more technical audience and can be seen as powerful graphical programming languages that by their very nature are detail rich. For process modelers, it can be difficult to simplify a business process model or a business scenario model to a suitable abstraction level and to include only a necessary level information. In real world organizations, business users have specific roles within the organization, i.e. they work as accountants, project managers, sales representatives etc. Therefore, business scenario navigation and visualization tools are advantageously relevant for a specific target role. The business scenario model of an organization can be integrated by nature. For example, sales processes trigger fulfilling, and fulfilling triggers accounting. Business users can have a need to understand, discuss, and adapt the transition points between end-to-end process and scenario chains in the software.

Existing business process or business scenario visualizations can suffer in usability due to their technical look-and-feel and a poorly modulated degree of technical detail. Business users can experience difficulties in translating a deep business process understanding into the operating mode of business software architecture (e.g. an ERP solution). In many cases, currently available visual representations (e.g. a "chevron" style flow chart, visualizations prepared using business process modeling notation (BPMN) or enhanced process chains (EPC), or the like) are considered too complex and/or too technical for a typical, non-technical business end user.

Such challenges can also apply to a business software architecture sales situation. For example, a prospective customer (e.g. a purchasing agent, an installation consultant, a potential subscriber to a software as a service produce, etc.) may have difficulty in fully understanding the capabilities of the business software architecture and in determining whether the solution is designed for and sufficiently flexible enough to support the customer's mission-critical business processes. Using currently available tools, the knowledge transfer required to answer such questions can be time-consuming and costly, both for the software seller and the prospective customer.

To address these and potentially other issues with currently available solutions, methods, systems, articles of manufacture, and the like consistent with one or more implementations of the current subject matter can, among other possible advantages, provide a scenario landscape overview map offering an intuitive way to visualize the scope of available business scenarios within a business scenario landscape available to a user via a business software architecture of an organization. Approaches consistent with one or more implementations can provide benefits in reducing the time and effort required to analyze an organization's business software needs vis-à-vis the features available within a business software architecture and/or those provided by external vendors.

A scenario landscape for an organization can refer to a set including all or some of the business scenarios and/or business processes characterizing an organization's operations. In general a business scenario can includes one or more business processes, process steps, or other business process features. Business process features can include, but are not limited to, one or more of business processes, process steps, sub-processes, tasks, activities, and the like. The business scenarios and business processes can be managed, and tasks relating to the completion of one or more steps of the business processes can be supported by, one or more feature modules of a business software architecture, such as for example an enterprise resource planning (ERP) system. The terms "instance of a business process," "instance of a business scenario," and similar descriptive terminology is intended to refer to a specific execution of a business process or a business scenario, respectively. For example, for a business scenario relating to sale of a product, each order taken and filled for that product can be considered as an instance of the business scenario. A business configuration can be a set of business scenarios including sets of business processes or business process features supported by the business software architecture and optionally customized to reflect the actual, real-life business functions (e.g. end-to-end business processes) performed by employees or other organization members on a recurring basis. A business configuration for an organization customer of a business software architecture is usually set up upon initial installation with occasional modifications or updates provided to reflect changes to the underlying real-life processes and procedures. Such a business configuration is typically constructed like a catalog, and its functions can be structured according to business areas, packages, topics and options. Once the initial business configuration is set up, all decisions are made, and the scoping is done, the business software architecture is ready for productive usage.

A scenario landscape map such as is described herein can serve as an integrated part of a business software solution and can include one or more of the following capabilities. In some implementations, a scenario landscape map can provide a visualization of business scenarios using a transit-map style, for example using a visual analog to a geographical map in the form of a schematic diagram in which routes and stations of a public transport system represent process flow and actions that are performed in the execution of a business scenario. The scenario landscape map can translate scenario or process flows visualized as route lines into end-to-end business scenarios, and stations or stops visualized as labeled icons into business processes and process steps. A business user or prospective business user can thereby be assisted in efficiently understanding, discussing, and/or adjusting the underlying business scenario model of an business software solution in either or both of the software sales and software implementation cycles. Unlike more technical displays of business process or business scenario information (e.g. business process modeling notation of the like), the scenario landscape map deliberately uses a pre-calculated level of reduced detail and accuracy in representing business scenario model semantics. Instead, the scenario landscape map, which can also be referred to as a scenario browser or the like, makes use of straight lines, fixed angles, and/or other relatively simply geometric shapes, and can make use of an approximately similar, fixed distance between "stops" on the route line (each of which can represent a business process feature) while hiding actual complications (e.g. decision trees, loops, branches, alternative routes, etc.) of the "real" underlying business scenario flow and, optionally, end-to-end scenario dependencies as well. Such an approach can create a simplified, linear abstracted visualization of the underlying software reality that provides just the right degree of detail for business-focused discussions.

Continuing with the analogy to transit maps, non-relevant or less relevant aspects of reality (e.g. pedestrian routes, buildings, rivers, etc.) can be excluded from the visualization to provide only the key information necessary to assist a rider in getting from a starting location to a destination. In a visualization model consistent with implementations of the current subject matter, "stations" (e.g. business process features such as business processes, process steps, sub-processes, etc. represented visually as points along the route line) that serve as interchanges between lines can be thought of as analogous to one or more integration or intersection points between end-to-end business scenarios.

The scenario landscape map or scenario browser need not be a static, "birds eye" view of a business scenario landscape, but can instead serve to focus information that are most relevant to a currently active business scenario, for example by positioning a route line representing the currently active business scenario in the approximate center of a scenario landscape map view with other integrated or intersecting business scenarios that form part of the business scenario landscape displayed in relation to the currently active business scenario. In another example, a most relevant business scenario of a specific role can be positioned in this manner with the most relevant business scenario being represented as a route line in the approximate center of the scenario landscape map view.

A scenario landscape map or process browser can also enable seamless zoom-in and zoom-out across an entire business process model of the organization in a manner similar to electronic geographical maps. A single scenario navigation tool, for example one as described in one or more of the related applications cited above or as described below can also be launched via the scenario landscape map or scenario browser to allow switching from a scenario landscape view to a transactional data processing mode.

Figure 1:
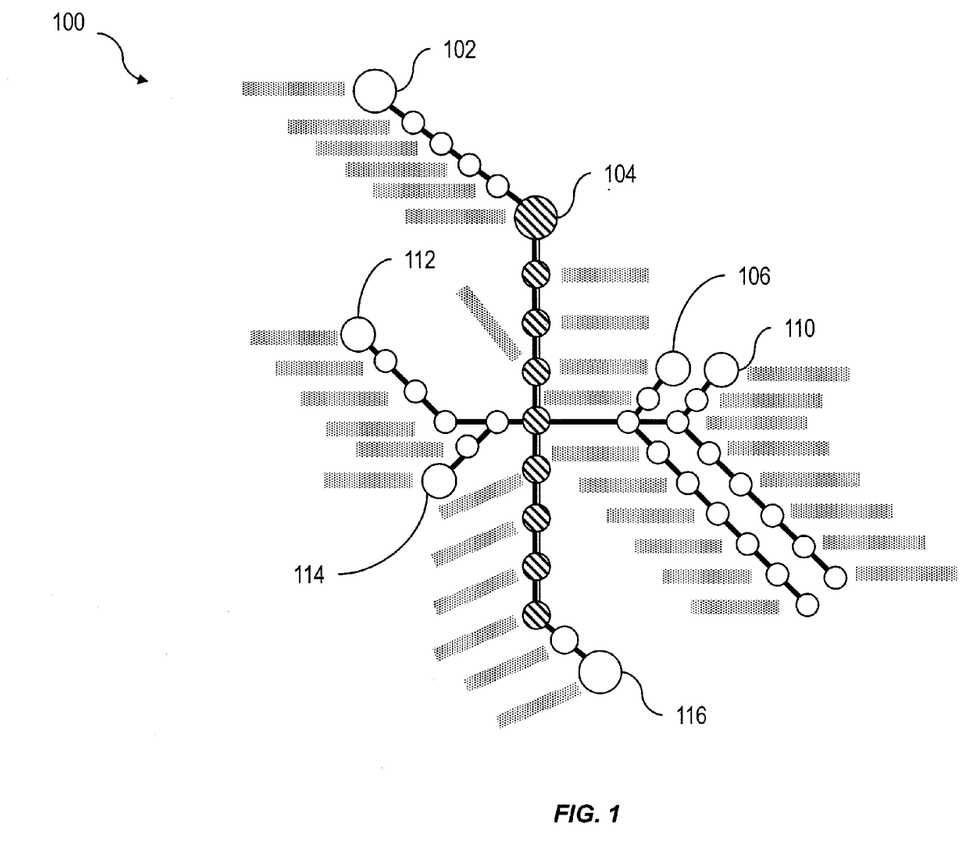
FIG. 1 shows a screenshot of a user interface illustrating a scenario-centric business scenario landscape overview view.

FIG. 1 illustrates an example of a scenario landscape overview map or scenario browser 100, which includes relational links between a plurality of business processes in a scenario landscape. Each of several business scenarios 102, 104, 106, 110, 112, 114, 116 are shown at a linear overview degree of detail to depict the relations between the different business scenarios 102, 104, 106, 110, 112, 114, 116 in the scenario landscape. In an implementation, the scenario landscape overview map 100 can be modeled as a transit map that shows the place and the function of each business scenario in the scenario landscape as a whole. Intrinsic relation types between the business scenarios 102, 104, 106, 110, 112, 114, 116 can include, but are not limited to, a predecessor scenario, which is defined as a business scenario whose completion is a prerequisite to another business scenario (e.g. business scenario 102, which includes several business processes or other business process features (shown in FIG. 1 as smaller circles) that lead to the initiation of business scenario 104); a successor scenario, which is defined as a business scenario having a predecessor scenario (e.g. business scenario 104, which has business scenario 102 as its predecessor scenario); a joint use scenario, which is defined as a business scenario that shares a common business process or other common business process feature, a common data object, a common responsible entity (e.g. a person, a unit, etc.), a common event, or the like (e.g. business scenarios 106 and 110, which share business process features with business scenario 112; or business scenario 116 and business scenario 104, which share a business process or other business process feature); and a hierarchical use scenario, which is defined as a business scenario that uses another business process or business scenario as a sub-scenario (e.g. business scenario 112, which includes as a branching sub-scenario the business scenario 114). Also as shown in FIG. 1, the business scenarios and/or the included business processes or business process features can be labeled in a manner similar to stops on a transit map.

Figure 2:
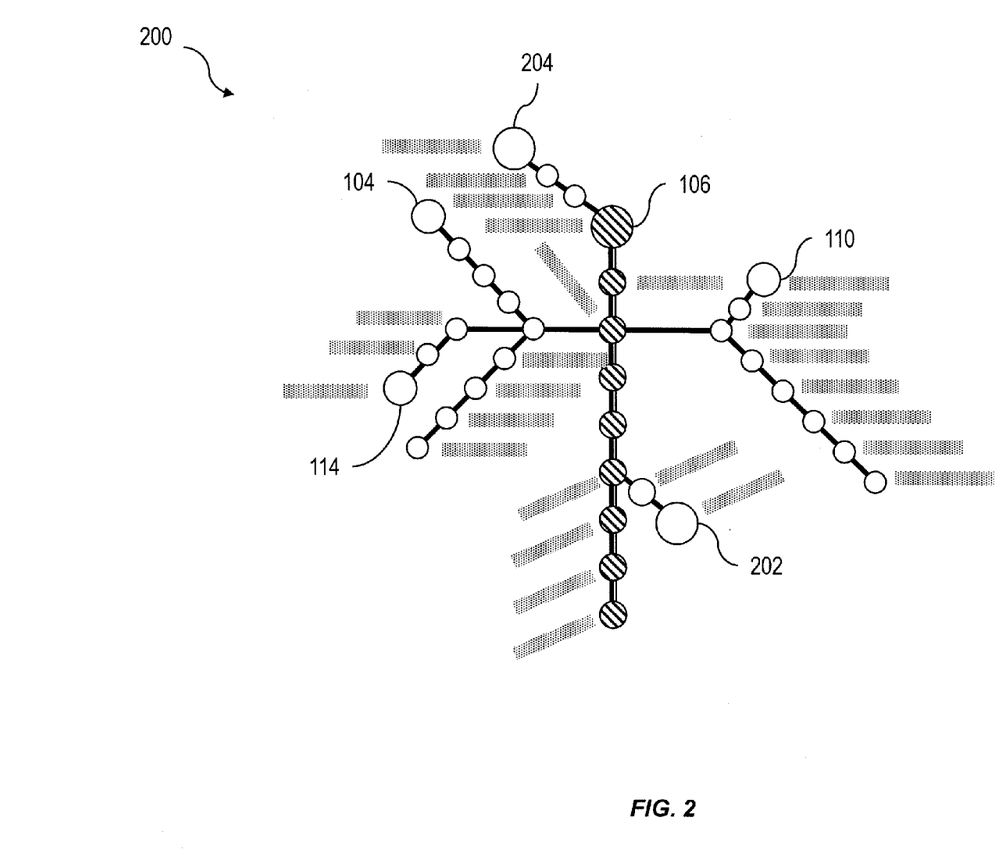
FIG. 2 shows another screenshot of a user interface illustrating a scenario-centric business scenario landscape overview view based on a newly selected business scenario.

The scenario landscape overview map 100 can advantageously be arranged in a scenario-centric manner, for example such that a selected business scenario 104 is arranged approximately centrally in the overview diagram with other business scenarios (e.g. including but not limited to the business scenario relationships explained in the preceding paragraph) relating to the selected business scenario 104 shown branching or intersecting with the selected business scenario 104. The selected business scenario 104 can optionally be a business scenario that is most relevant to a current role of a user, a currently active business scenario, or the like. The scenario overview map 100 can also advantageously include one or more visual cues to indicate information about the various business scenarios, business processes, and/or the business process features shown in the scenario overview map 100. For example, the route line 120 of the selected business scenario 104 can be shown in a different thickness, with a different pattern, in a different color or brightness, or the like, and the business processes or business process features of the selected business scenario 104 can likewise be shown with a different pattern, color, brightness, etc. Clicking on a business process or business process feature of the selected business scenario 104 can directly navigate a user to a linear single scenario view of the currently active business scenario displayed simultaneously with a work space including user interface elements related to completion, monitoring, etc. of the selected business process or business process feature. Clicking on a business process or business process feature of another scenario besides the selected business scenario 104 can cause the scenario overview map 100 to rearrange to show the scenario landscape with a new scenario-centric view based on the newly selected business scenario, for example as shown in FIG. 2, in which the newly selected process 106 is now arranged approximately centrally in the scenario landscape overview map 100 with other business processes 110, 114, 202, 204, as well as the previously selected business process 104, that are related to the newly selected business process 106 arranged in relation to the newly selected business process 106.

Figure 3:
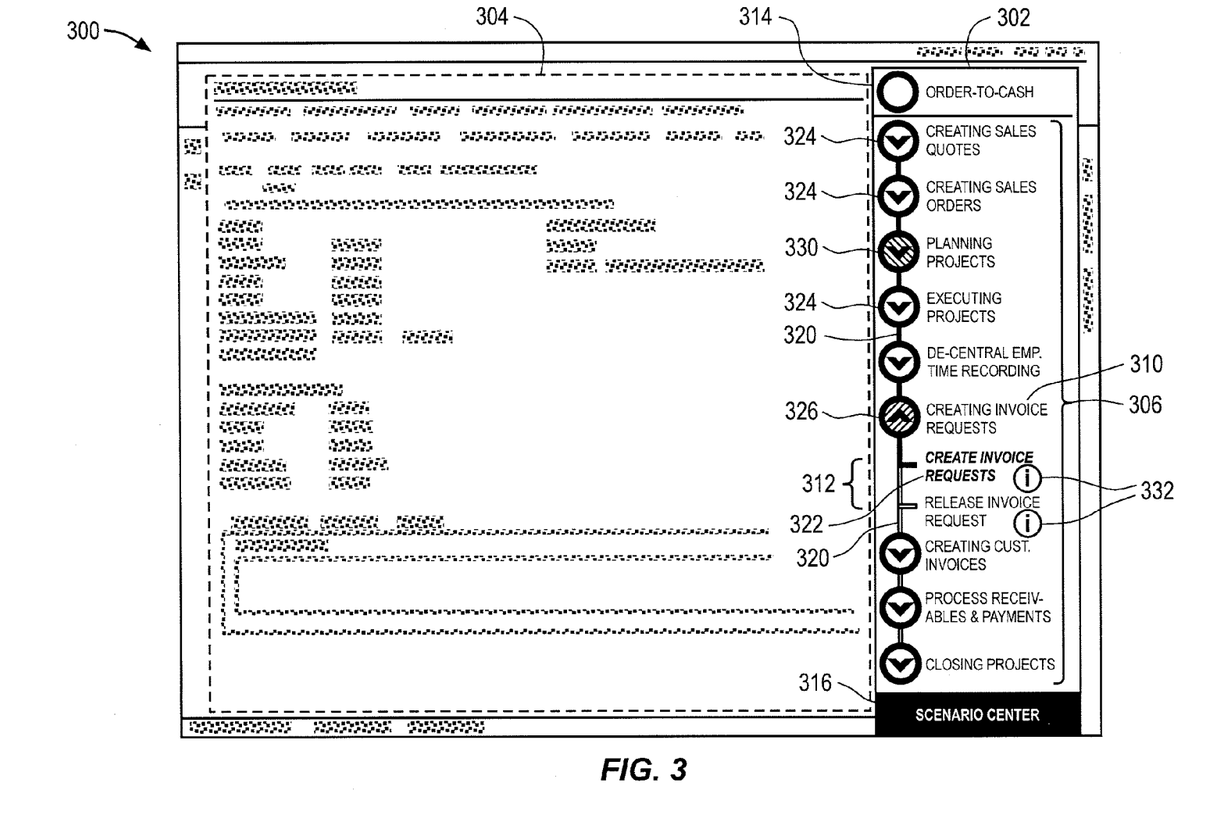
FIG. 3 shows another screenshot of a user interface illustrating a structured business scenario detail view.

FIG. 3 illustrates an example of a linear single scenario view 300, which shows a single business scenario as a linear sequence of business process features, which can be business processes, process steps, sub-processes, tasks, activities, etc. represented by a set of first user interface features. The structure of the business scenario is condensed into a linear view, even though the actual flow of business process features necessary to complete an instance of the business process often involves explicit parallelism, decisions, loops, event driven changes in control flow, exceptions, and the like. Consistent with the scope of the current subject matter, any viable approach can be used to shape a business scenario into such a linear view.

As shown in FIG. 3, a process navigation pane 302 and a work pane 304 are concurrently displayed. A plurality of first user interface elements 306 are displayed in the process navigation pane 302 and arranged in a linear progression to represent the linear sequence of process steps in the process model of the currently actively business process. A first user interface element 310 corresponding to a business process having additional process steps can be expanded as shown in FIG. 3 to display additional user interface elements 312 corresponding to the process steps. Also as shown in FIG. 3, the currently active business scenario can be identified by one or more scenario identifier user elements 314. A scenario browser user interface element 316 can link to the upper level scenario landscape overview map 100, 200 to display an overall scenario landscape map showing intersections between scenarios and providing links to navigate to the other scenarios in the scenario landscape.

The first user interface elements 306 can be displayed in a manner similar to a transit route map with each process step or sub-step being represented like a stop on the route. In this manner, a familiar visual format can rapidly convey additional information about a current context within a specific instance of the business scenario as well as status information about the various business process features along the "route" to completion of the instance. For example, a route line 320 connecting the "stops" can be presented with a first visual effect (e.g. color, brightness, shade, dots or dashes, etc.) up to the "stop" representing the process step that is currently "active" with related functionality being provided in the work pane 304. The currently active business process feature can be further indicated using textual or visual cues, such as for example color, shading, font, a highlighting box, etc. As a non-limiting example, the name of the business process feature displayed in conjunction with the user interface element 322 corresponding to the currently active process step in FIG. 3 is formatted in a bold and italicized font. A different second visual effect can be used for the remainder of the route line 320 leading to the "stops" past the currently active business process feature. The icons 324 used to represent the "stops" in the scenario navigation pane can also include visual cues to inform a user about status, other business process features that are included within the currently displayed business process or business process feature user interface elements and that can be revealed by a user action to expand the route map, or the like.

Also in the example shown in FIG. 3, the expanded business process 310 is also an intersecting business process that includes additional process steps or other business process features that are part of a second business scenario. The additional business process features are illustrated by first user elements 312 incorporated directly into the route map without branching to maintain the linear progression of the scenario model. The first user interface element 326 representing the "stop" corresponding to this business process can include a different visual presentation than other non-intersecting "stops" and can further include other visual presentation features to indicate that it is currently expanded as shown in FIG. 3. The "stop" first user interface element 330 corresponding to another intersecting business process or business process feature (e.g. planning projects in the example of FIG. 3) can include features indicating that it is an intersecting business process or business process feature with expandability, but that it currently is not expanded. Additional first user interface elements 332 (e.g. the "i" icons shown in FIG. 3) can provide additional details about one or more of the business processes or business process features. For example, selection by user of one of these additional user interface elements 332 can cause the user interface to navigate to present a third visualization layer that includes a structured business scenario detail view.

Figure 4:
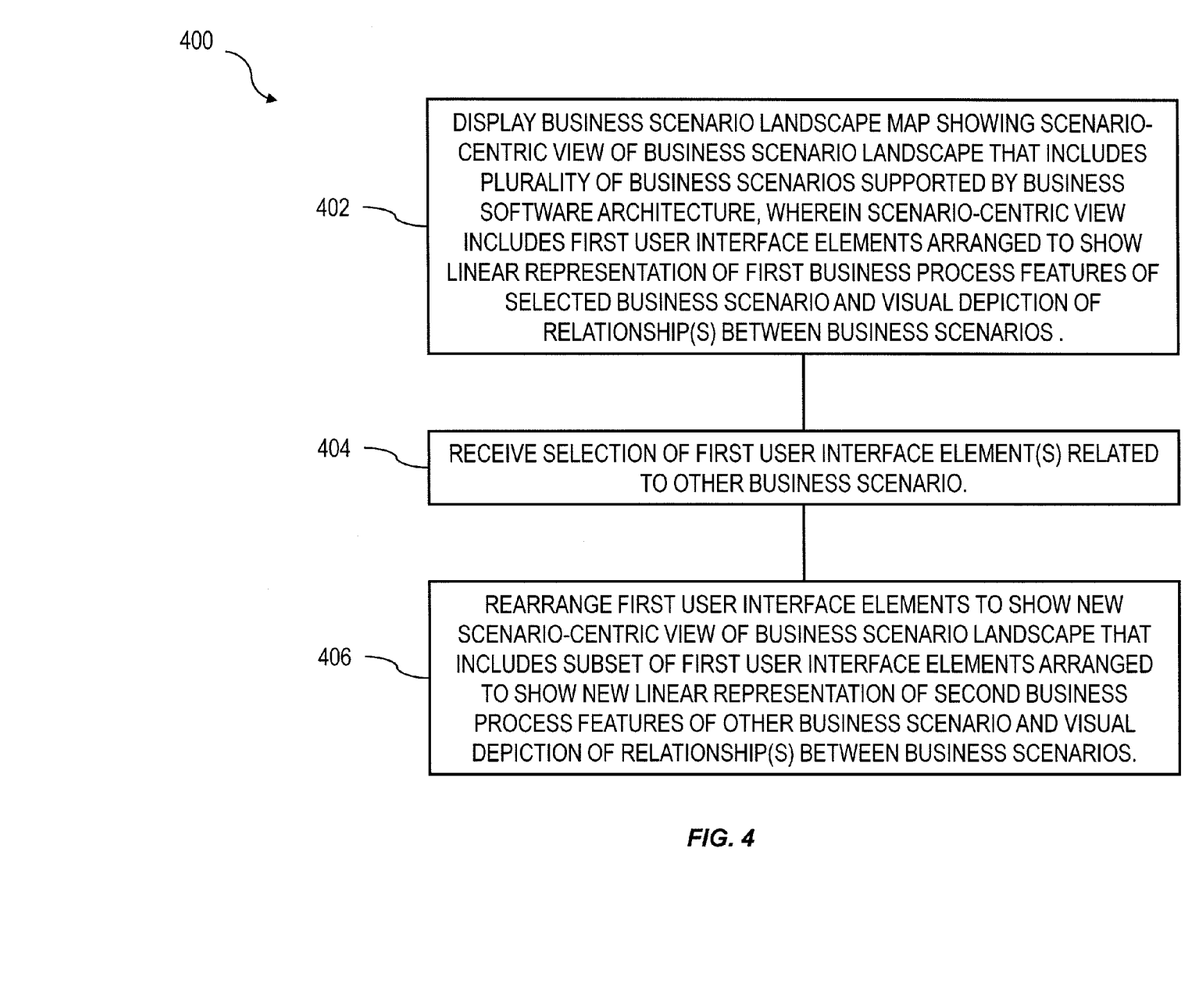
FIG. 4 is a process flow diagram illustrating aspects of a method having one or more features consistent with implementations of the current subject matter.

FIG. 4 shows a process flow chart 400 illustrating a method having one or more features consistent with implementations of the current subject matter. At 402, a user interface displays a business scenario landscape map showing a scenario-centric view of a business scenario landscape that includes a plurality of business scenarios accessible to members of an organization and supported by a business software architecture. The scenario-centric view includes a plurality of first user interface elements arranged to show a linear representation of a plurality of first business process features of a selected business scenario of the plurality of business scenarios and a visual depiction of at least one relationship between the selected business scenario and an other business process of the plurality of business scenarios. At 404, a selection of one or more of the plurality of first user interface elements related to the other business scenario is received via the user interface, and at 406, the plurality of first user interface elements is rearranged in response to the receiving to show a new scenario-centric view of the business scenario landscape that includes at least a subset of the plurality of first user interface elements arranged to show a new linear representation of a plurality of second business process features of the other business scenario and a visual depiction of the at least one relationship and of at least one other relationship between the other business scenario and a third business scenario.

Upon rearranging of the business scenario landscape map to show the new scenario-centric view, some or all of the first user interface elements can be included, perhaps with modifications to highlight the newly selected business scenario. Additional second user interface elements that were not present before the rearranging may also be displayed, for example to depict additional business scenarios that have relationships to the newly selected business scenario but that were not sufficiently relevant to the originally selected business scenario to be shown in the original scenario-centric view of the business scenario landscape map.

In another optional implementation of the current subject matter, a business scenario visualization tool or scenario landscape overview map can be used in cross-selling of additional features of a business software architecture or of features provided by a third-party add-on module or software component to an existing customer. A scenario landscape overview map or scenario browser 100, 200 as shown in FIG. 1 and FIG. 2 can provide a visualization of already deployed or already in use scenarios in using a first color, shading, shape, or other visual depiction, while additional scenarios, business processes, features, etc. that are not yet purchased or that will be provided in future releases, etc. can be depicted in a second manner (e.g. grayed out, with dashed lines etc.). A sales representative, customer support specialist, etc. can use such a tool to readily see what a customer is using today (optionally including one or more metrics indicating an intensity of use of different feature sets, scenarios, processes, etc.) and can provide a targeted up-selling proposal for not yet used or new business scenarios from the core software platform vendor or from other external vendors.

Figure 5:
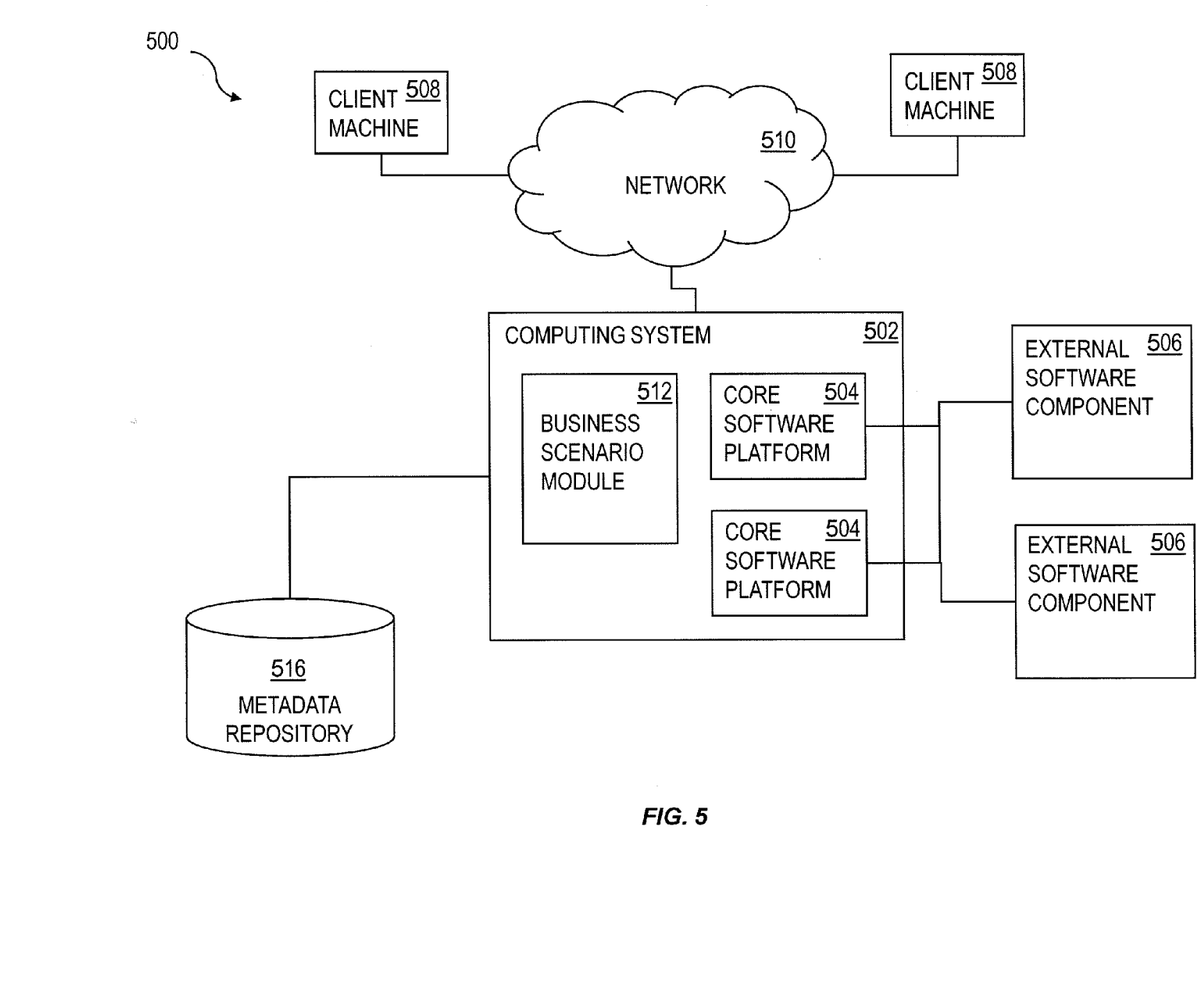
FIG. 5 is a diagram illustrating aspects of a system showing features consistent with implementations of the current subject matter.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. FIG. 5 shows a diagram of a system consistent with such an implementation. A computing system 502 can include one or more core software platform modules 504 providing one or more features of the ERP system. The computing system can also aggregate or otherwise provide a gateway via which users can access functionality provided by one or more external software components 506, which can optionally be available from a service provider external to the core software platform modules 504. Client machines 508 can access the computing system, either via a direct connection, a local terminal, or over a network 510 (e.g. a local area network, a wide area network, a wireless network, the Internet, or the like). A business process guidance and recording module 512 can be hosted on the computing system 502 or alternatively, on an external system accessible over a network connection. The business scenario guidance and recording module 512 can optionally include one or more discrete software and/or hardware modules that perform operations such as those described herein.

The business scenario guidance and recording module 512 can access one or more metadata repositories 516 and/or other data repositories that can store the definition of business process as well as data relating to concrete instances of the data objects (e.g. business objects) that are relevant to a specific instance of the business process. In some examples, the definition can optionally be stored as a business object. In some implementations, the business object can include a template definition of a standard business process. The template definition that can optionally be modified via one or more extensions that are stored in the one or more metadata repositories 516.

Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

In a software delivery configuration in which services of an ERP system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 6:
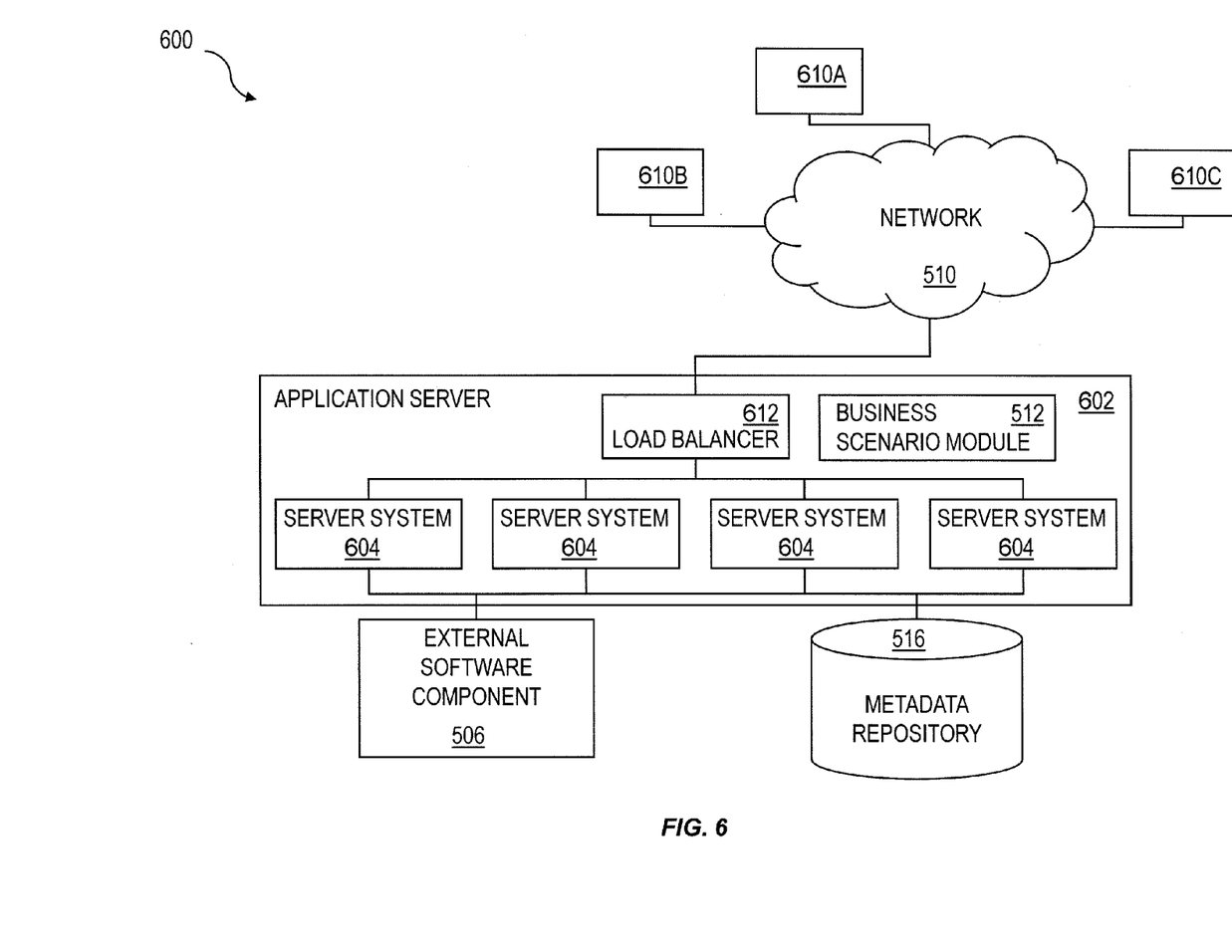
FIG. 6 is a diagram illustrating aspects of a system showing features consistent with implementations of the current subject matter.

FIG. 6 shows a block diagram of a multi-tenant implementation of a software delivery architecture 600 that includes an application server 602, which can in some implementations include multiple server systems 604 that are accessible over a network 606 from client machines operated by users at each of multiple organizations 610A-610C (referred to herein as "tenants" of a multi-tenant system) supported by a single software delivery architecture 600. For a system in which the application server 602 includes multiple server systems 604, the application server can include a load balancer 612 to distribute requests and actions from users at the one or more organizations 610A-610C to the one or more server systems 604. Instances of the core software platform 504 (not shown in FIG. 6) can be executed in a distributed manner across the server systems 604. A user can access the software delivery architecture across the network using a thin client, such as for example a web browser or the like, or other portal software running on a client machine. The application server 602 can access data and data objects stored in one or more data repositories 516. The application server 602 can also serve as a middleware component via which access is provided to one or more external software components 506 that can be provided by third party developers.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 602 that includes multiple server systems 604 that handle processing loads distributed by a load balancer 612. Potential benefits from such an arrangement can include, but are not limited to, high and reliably continuous application server availability and minimization of unplanned downtime, phased updating of the multiple server systems 604 to permit continuous availability (one server system 604 can be taken offline while the other systems continue to provide services via the load balancer 612), scalability via addition or removal of a server system 604 that is accessed via the load balancer 612, and de-coupled lifecycle processes (such as for example system maintenance, software upgrades, etc.) that enable updating of the core software independently of tenant-specific customizations implemented by individual tenants.

As in the example illustrated in FIG. 5, the metadata repository 516 can store a business object that represents a template definition of a standard business process. Each individual tenant 610A-610C can customize that standard template according to the individual business process features specific to business of the organization to which that tenant is assigned. Customizations can be stored as extensions in the metadata repository.

Figure 7:
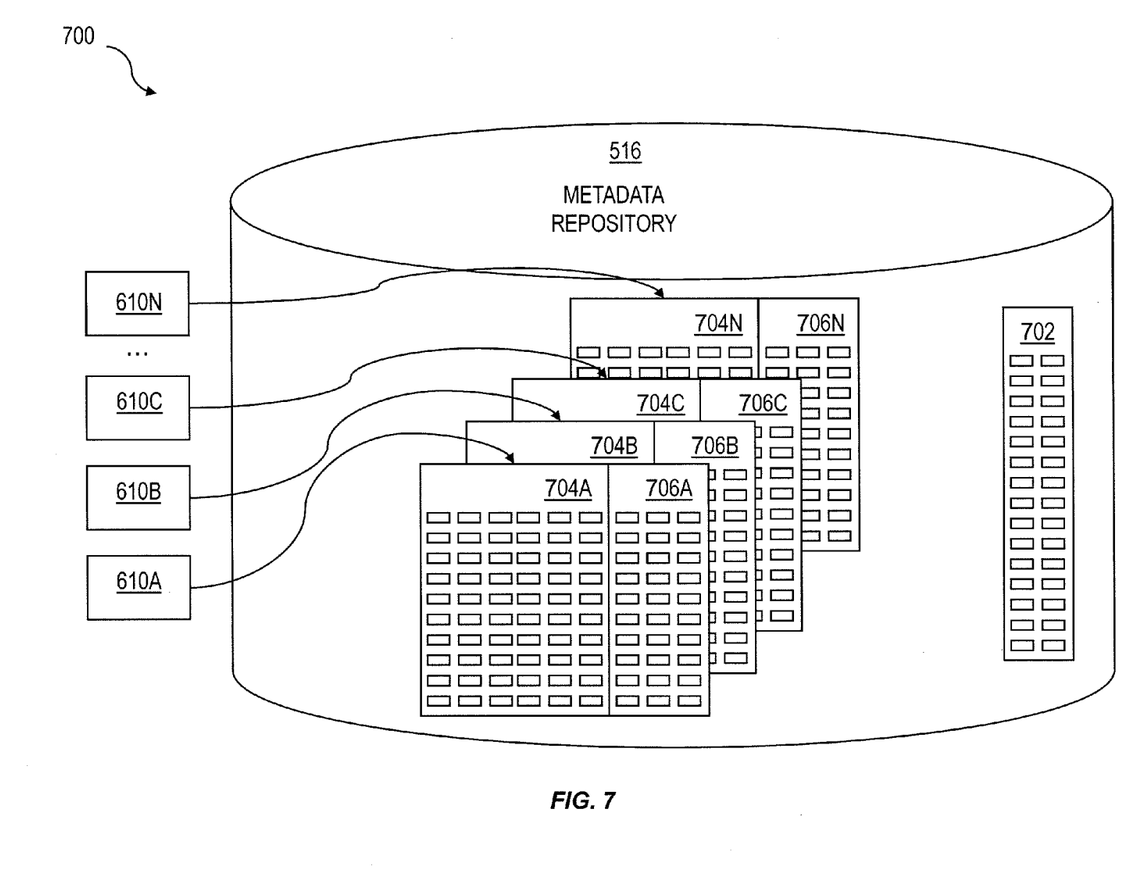
FIG. 7 is a diagram illustrating a data repository showing features consistent with implementations of the current subject matter.

To provide for customization of the business process for each of multiple organizations supported by a single software delivery architecture 600, the data and data objects stored in the metadata repository 516 and/or other data repositories that are accessed by the application server 602 can include three types of content as shown in FIG. 7: core software platform content 702 (e.g. a standard definition of a business process), system content 704 and tenant content 706. Core software platform content 702 includes content that represents core functionality and is not modifiable by a tenant. System content 704 can in some examples be created by the runtime of the core software platform and can include core data objects that store concrete data associated with specific instances of a given business process and that are modifiable with data provided by each tenant. The data retained in these data objects are tenant-specific: for example, each tenant 610A-610N can store information about its own inventory, sales order, etc. Tenant content 706A-706N includes data objects or extensions to other data objects that are customized for one specific tenant 610A-610N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 706 can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content 702 and system content 704 and tenant content 706 of a specific tenant are accessed to provide the business process definition and/or the status information relating to a specific instance of the business process according to customizations and business data of that tenant such that each tenant is provided access to a customized solution whose data are available only to users from that tenant.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:

displaying, via a user interface, a business scenario landscape map showing a scenario-centric view of a business scenario landscape, the business scenario landscape comprising a plurality of business scenarios accessible to members of an organization and supported by a business software architecture, the scenario-centric view comprising a first subset of a plurality of first user interface elements arranged to show a linear representation of a plurality of first business process features of a selected business scenario of the plurality of business scenarios, the scenario-centric view further comprising a second subset of the plurality of first user interface elements arranged to show at least one relationship between the selected business scenario and an other business scenario of the plurality of business scenarios, wherein the linear representation comprises the first subset of the plurality of first user interface elements disposed approximately centrally in the scenario-centric view and forming a single straight line;

receiving, via the user interface, a selection of one or more of the second subset of the plurality of first user interface elements related to the other business scenario;

rearranging, in response to receiving the selection, the plurality of first user interface elements to show a new scenario-centric view of the business scenario landscape, the new scenario-centric view comprising the second subset of the plurality of first user interface elements arranged to show a new linear representation of a plurality of second business process features of the other business scenario and the first subset of the first user interface elements arranged to show the at least one relationship and at least one other relationship between the other business scenario and a third business scenario, wherein the new linear representation comprises the second subset of the plurality of first user interface elements disposed approximately centrally in the new scenario-centric view and forming a single straight line, and wherein the first subset of the plurality of first user interface elements are arranged to show a subordinate relationship of the plurality of the first business process features to the plurality of second business process features of the other business scenario.

2. A computer program product as in claim 1, wherein the at least one relationship comprises one or more of a business scenario intersection relationship, a business scenario dependency relationship, a business scenario prerequisite relationship, and a business scenario predecessor-successor relationship.

3. A computer program product as in claim 1, wherein the selected business scenario comprises at least one of a currently active business scenario being operated on by a current user of the business software architecture and a most relevant business scenario to a role of the current user.

4. A computer program product as in claim 1, wherein the operations further comprise presenting, via the user interface upon receiving a navigation command entered via one or more of the plurality of first user interface elements, a second visualization layer based on the metadata, the second visualization layer comprising a plurality of second user interface elements displayed in a navigation pane concurrently with a work pane, the plurality of second user interface elements being arranged in a linear progression to represent a linear sequence of the plurality of second business process features of the other business scenario, the work pane comprising a plurality of additional user interface elements corresponding to functionality provided by one or more feature modules of the business software architecture related to a currently selected one of the plurality of second business process features.

5. A computer program product as in claim 1, wherein the plurality of first user interface elements are arranged in the business scenario landscape map to form a transit map view of the business scenario landscape in which each of the selected business scenario and the other business scenario are shown as linearized processes represented by a plurality of stops each representing a business process feature that is part of one or more of the selected business scenario and the other business scenario and a linear route linking at least some of those business process features that are part of each of the selected business scenario and the other business scenario.

6. A computer program product as in claim 1, wherein the subordinate scenario includes at least one of a predecessor scenario, a successor scenario, a joint use scenario, and a hierarchical use scenario.

7. A system comprising:
   at least one programmable processor; and
   a machine-readable medium storing instructions that, when executed by the at least one processor, cause the at least one programmable processor to perform operations comprising:
   displaying, via a user interface, a business scenario landscape map showing a scenario-centric view of a business scenario landscape, the business scenario landscape comprising a plurality of business scenarios accessible to members of an organization and supported by a business software architecture, the scenario-centric view comprising a first subset of a plurality of first user interface elements arranged to show a linear representation of a plurality of first business process features of a selected business scenario of the plurality of business scenarios, the scenario-centric view further comprising a second subset of the plurality of first user interface elements arranged to show at least one relationship between the selected business scenario and an other business scenario of the plurality of business scenarios, wherein the linear representation comprises the first subset of the plurality of first user interface elements disposed approximately centrally in the scenario-centric view and forming a single straight line;
   receiving, via the user interface, a selection of one or more of the second subset of the plurality of first user interface elements related to the other business scenario;
   rearranging, in response to receiving the selection, the plurality of first user interface elements to show a new scenario-centric view of the business scenario landscape, the new scenario-centric view comprising the second subset of the plurality of first user interface elements arranged to show a new linear representation of a plurality of second business process features of the other business scenario and the first subset of the first user interface elements arranged to show the at least one relationship and at least one other relationship between the other business scenario and a third business scenario, wherein the new linear representation comprises the second subset of the plurality of first user interface elements disposed approximately centrally in the new scenario-centric view and forming a single straight line, and wherein the first subset of the plurality of first user interface elements are arranged to show a subordinate relationship of the plurality of the first business process features to the plurality of second business process features of the other business scenario.

8. A system as in claim 7, wherein the at least one relationship comprises one or more of a business scenario intersection relationship, a business scenario dependency relationship, a business scenario prerequisite relationship, and a business scenario predecessor-successor relationship.

9. A system as in claim 7, wherein the selected business scenario comprises at least one of a currently active business scenario being operated on by a current user of the business software architecture and a most relevant business scenario to a role of the current user.

10. A system as in claim 7, wherein the operations further comprise presenting, via the user interface upon receiving a navigation command entered via one or more of the plurality of first user interface elements, a second visualization layer based on the metadata, the second visualization layer comprising a plurality of second user interface elements displayed in a navigation pane concurrently with a work pane, the plurality of second user interface elements being arranged in a linear progression to represent a linear sequence of the plurality of second business process features of the other business scenario, the work pane comprising a plurality of additional user interface elements corresponding to functionality provided by one or more feature modules of the business software architecture related to a currently selected one of the plurality of second business process features.

11. A system as in claim 7, wherein the plurality of first user interface elements are arranged in the business scenario landscape map to form a transit map view of the business scenario landscape in which each of the selected business scenario and the other business scenario are shown as linearized processes represented by a plurality of stops each representing a business process feature that is part of one or more of the selected business scenario and the other business scenario and a linear route linking at least some of those business process features that are part of each of the selected business scenario and the other business scenario.

12. A computer-implemented method comprising:
   displaying, via a user interface, a business scenario landscape map showing a scenario-centric view of a business scenario landscape, the business scenario landscape comprising a plurality of business scenarios accessible to members of an organization and supported by a business software architecture, the scenario-centric view comprising a first subset of a plurality of first user interface elements arranged to show a linear representation of a plurality of first business process features of a selected business scenario of the plurality of business scenarios, the scenario-centric view further comprising a second subset of the plurality of first user interface elements arranged to show at least one relationship between the selected business scenario and an other business scenario of the plurality of business scenarios, wherein the linear representation comprises the first subset of the plurality of first user interface elements disposed approximately centrally in the scenario-centric view and forming a single straight line;
   receiving, via the user interface, a selection of one or more of the second subset of the plurality of first user interface elements related to the other business scenario;
   rearranging, in response to receiving the selection, the plurality of first user interface elements to show a new scenario-centric view of the business scenario landscape, the new scenario-centric view comprising the second subset of the plurality of first user interface elements arranged to show a new linear representation of a plurality of second business process features of the other business scenario and the first subset of the first user interface elements arranged to show the at least one relationship and at least one other relationship between the other business scenario and a third business scenario, wherein the new linear representation comprises the second subset of the plurality of first user interface elements disposed approximately centrally in the new scenario-centric view and forming a single straight line, and wherein the first subset of the plurality of first user interface elements are arranged to show a subordinate relationship of the plurality of the first business process features to the plurality of second business process features of the other business scenario.

13. A computer-implemented method as in claim 12, wherein the at least one relationship comprises one or more of a business scenario intersection relationship, a business scenario dependency relationship, a business scenario prerequisite relationship, and a business scenario predecessor-successor relationship.

14. A computer-implemented method as in claim 12, wherein the selected business scenario comprises at least one of a currently active business scenario being operated on by a current user of the business software architecture and a most relevant business scenario to a role of the current user.

15. A computer-implemented method as in claim 12, further comprising presenting, via the user interface upon receiving a navigation command entered via one or more of the plurality of first user interface elements, a second visualization layer based on the metadata, the second visualization layer comprising a plurality of second user interface elements displayed in a navigation pane concurrently with a work pane, the plurality of second user interface elements being arranged in a linear progression to represent a linear sequence of the plurality of second business process features of the other business scenario, the work pane comprising a plurality of additional user interface elements corresponding to functionality provided by one or more feature modules of the business software architecture related to a currently selected one of the plurality of second business process features.

16. A computer-implemented method as in claim 12, wherein the plurality of first user interface elements are arranged in the business scenario landscape map to form a transit map view of the business scenario landscape in which each of the selected business scenario and the other business scenario are shown as linearized processes represented by a plurality of stops each representing a business process feature that is part of one or more of the selected business scenario and the other business scenario and a linear route linking at least some of those business process features that are part of each of the selected business scenario and the other business scenario.

17. A computer-implemented method as in claim 12, wherein at least one of the displaying, the receiving, and the rearranging is performed by at least one programmable processor.

\* \* \* \* \*